2 Sheets—Sheet 1.

S. COMFORT, Jr.

Harvester Dropper.

No. 2,522. Reissued March 19, 1867.

Witnesses.
Henry Howson
William Wallace

Inventor
Samuel Comfort, Jr.

N. PETERS, Photo-Lithographer, Washington, D. C.

2 Sheets—Sheet 2.
S. COMFORT, Jr.
Harvester Dropper.
No. 2,522.
Reissued March 19, 1867.
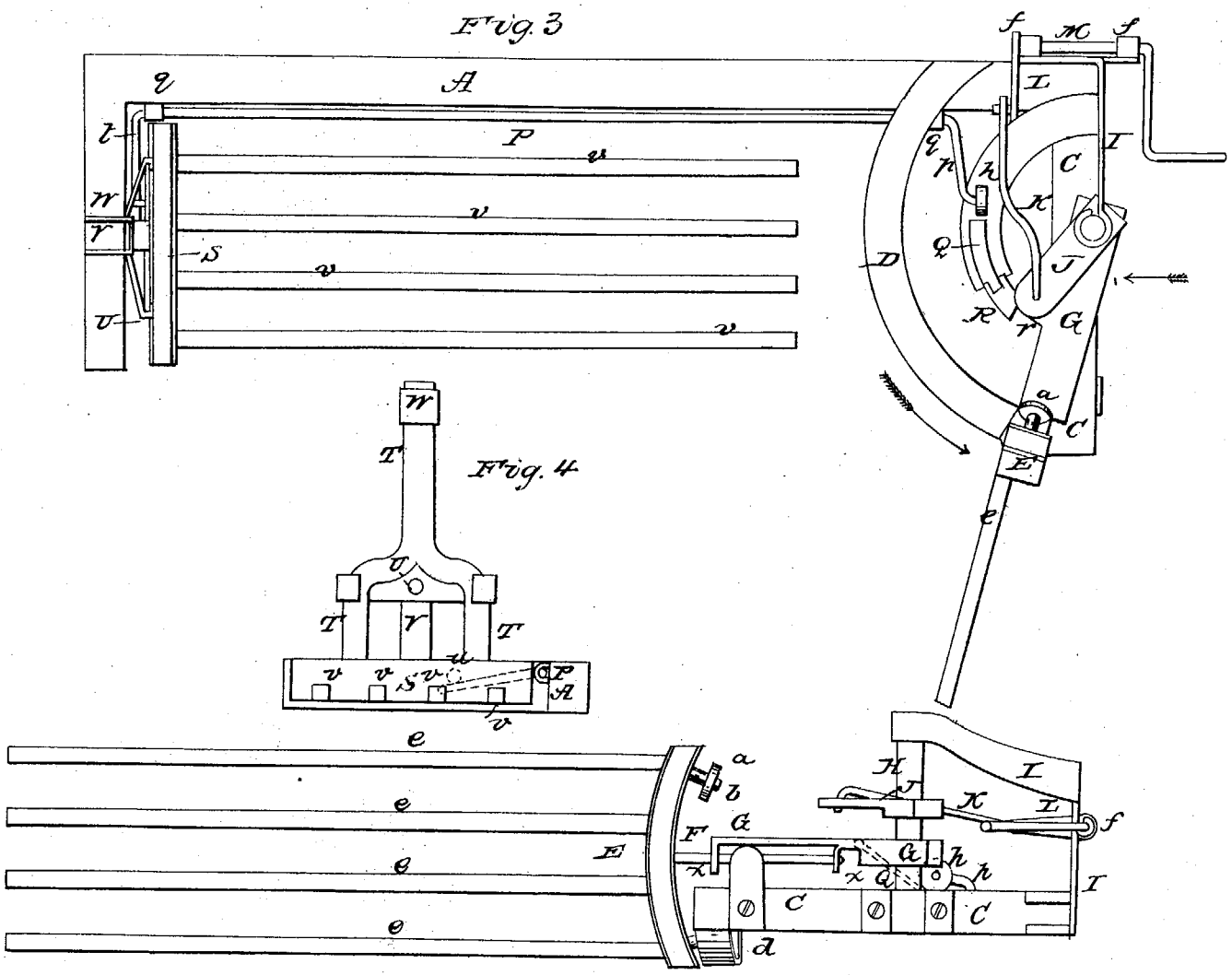
Witnesses
Henry Howson
William E. Mullin
Inventor
Samuel Comfort, Jr.
N. PETERS, Photo-Lithographer, Washington, D. C.

United States Patent Office.

ADAM R. REESE, OF PHILLIPSBURG, NEW JERSEY, ASSIGNEE OF SAMUEL COMFORT, JR., OF MORRISVILLE, PENNSYLVANIA.

*Letters Patent No.* 14,553, *dated April* 1, 1856; *reissue No.* 2,522, *dated March* 19, 1867.

IMPROVEMENT IN HARVESTERS.

The Schedule referred to in these Letters Patent and making part of the same.

TO ALL WHOM IT MAY CONCERN:

Be it known that SAMUEL COMFORT, Jr., of Morrisville, Bucks county, Pennsylvania, invented certain new and useful Improvements in Harvesters, of which the following is a full, clear, and exact description, reference being had to the accompanying drawings, and to the letters of reference marked thereon, and in which—

Figure 3 is a plan showing the platform or dropper in a different position to that shown in fig. 1.

Figure 4 is a sectional view on the line 1–2, fig. 2, and looking in the direction of the arrow.

Figure 5 is an end of fig. 3 looking in the direction of the arrow.

The same letters of reference refer to similar parts throughout the several views.

Figures 1, 2:
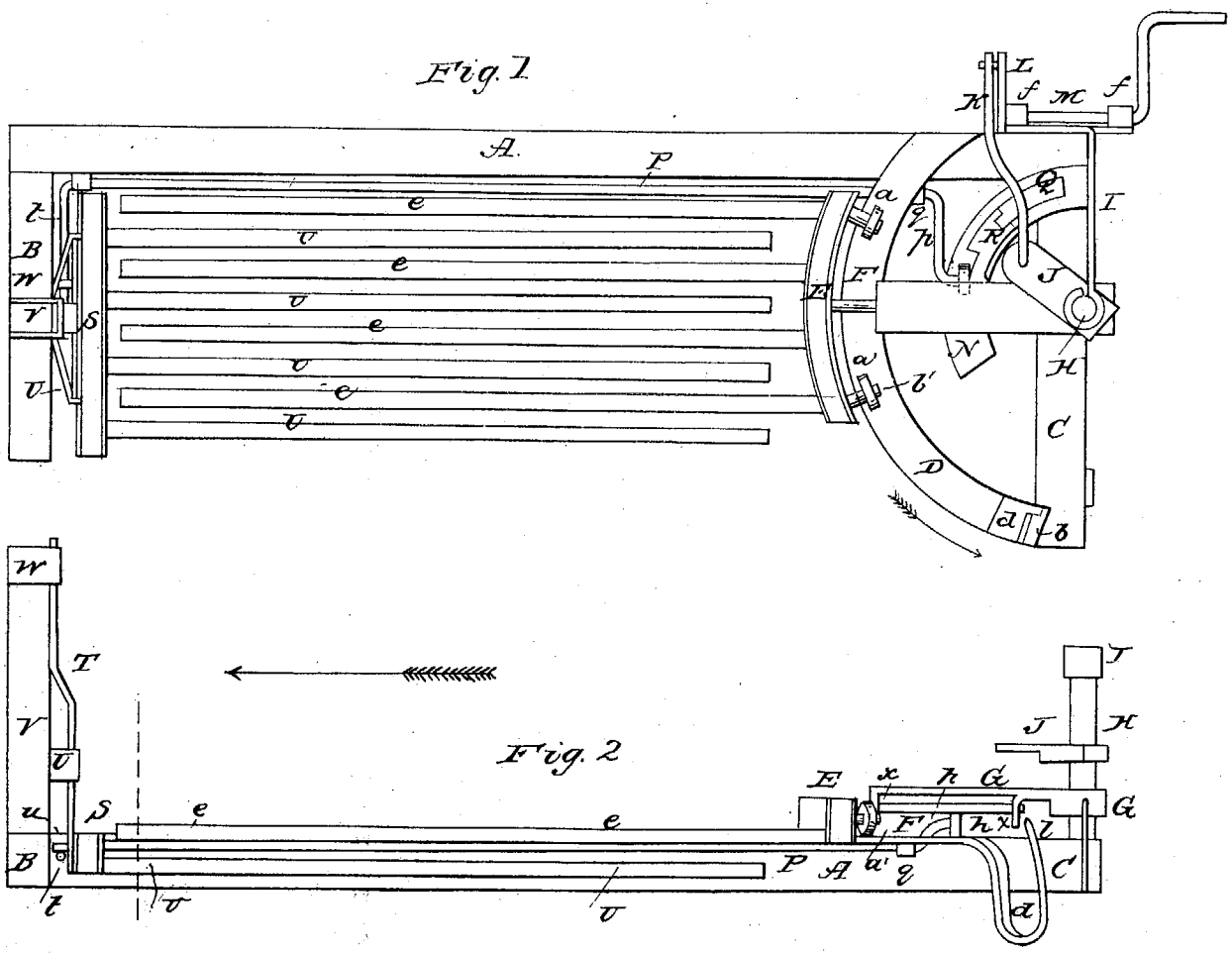
Figure 1 is a plan view of so much of a harvesting machine as is necessary to show said improvements.
Figure 2 is an edge view of the same.

The improvement consists in combining with a harvesting machine a platform to support the falling grain, made of slats, supported at one end only, in discharging the grain at one side and out of the way of the next round of the machine, by the movements of the platform itself; in the employment of a device automatically operated, which is interposed to receive and support the falling grain while the completed gavel is being discharged upon the ground; and in the combination of a slatted platform or dropper with an automatically operated device for receiving the falling grain while the platform is being operated to discharge the gavel accumulated thereon.

A represents either the cutter-bar of a harvester, or a bar at the back of the cutter-bar, to one end of which and at right angles thereto is secured the bar B, and to the opposite end the bar C. The outer end of the latter is connected to the bar A by a curved plate, D. This plate, near its junction with the end of the bar C, is bent down so as to form a curved recess, *d*, (see fig. 2,) for a purpose hereinafter described. On the curved plate D rest the two rollers *a* and *a'*, which are hung loose on pins *b* and *b'*, the latter being secured, one near each end of the curved bar E, to which are secured any convenient number of rods or slats *e e e e*, forming the slatted platform or dropper. To the curved bar E is also secured a shaft or spindle, F, which is arranged so as to turn freely in lips *x x*, projecting from the under side of the arm G, the latter being permanently secured to the vertical shaft H, which has its upper bearing in the bracket I, secured to the cutter-bar A, (see fig. 5.) To the vertical shaft H is secured the lever J, connected by means of the rod K to the crank L on the end of the shaft M, which has its bearings in lugs *f f* on the bracket I. Near the junction of the bar A with the bar C is secured another curved plate, N, on which rests the roller *h* at the end of the cranked portion *p* of the horizontal shaft P when the said roller *h* is not raised from the said plate by the inclined plane Q, which is jointed to the projection R, the latter being attached to or forming a part of the arm G. The projection R has a piece cut out near its junction with the arm G so as to form an opening, *r*, for a purpose hereinafter set forth. The shaft P traverses the back of the bar A, and has its bearings in brackets *q q*, secured to the same, the end of the shaft being cranked at *t*; and this cranked portion bearing against the under side of a pin, *u*, which projects from and is secured to the back of the bar S, from which projects a series of rods or slats, *v v*, which are so arranged that when the slotted platform or dropper is in the position shown in fig. 1 the said rods or slats coincide with the spaces between the slats *e e* of the platform or dropper. To the back of the bar S is secured the guide T, (see fig. 4,) the lower legs of which slide in a bracket, *u*, on the upright piece V, which is secured to the bar B, the upper leg being guided in a sleeve, W, attached to the top of the upright.

The operation is as follows: The harvester, to which the apparatus is attached, being drawn over the ground, and motion being communicated from any working part of the machine to the shaft M, supposing the parts to be in position shown in figs. 1 and 2, and that a quantity of the cut grain sufficient to form a gavel or sheaf has accumulated on the platform or dropper, the crank L is at its farthest outward extent, and the turning of the shaft M in either direction operates on the lever J through the rod K so as to turn the vertical shaft H, and with it the arm G, as well as the shaft F and slatted dropper E in the direction of the arrow, (figs. 1 and 2.) During this movement the platform or dropper remains in a horizontal position until the roller *a'* coincides with the top of the curved recess *d* in the plate D, when the roller, striking against the projecting lip *l*.

descends into the recess, and thereby causes the platform to tilt and discharge the grain upon the ground. During the above movements it will be observed that the inclined plane Q passed over the roller *h*, and that, consequently, the position of the latter, as well as of the slats *v v*, remained undisturbed, the grain being continually deposited upon the latter as the machine is drawn over the ground. The crank L, having arrived at its extreme inward stroke, a further turning of the shaft M causes the slatted platform, as the roller *a* is removed from the recess *d*, to resume its horizontal position. Before it reaches the slats *v v*, however, the inclined plane Q bears with its point against the under side of the roller *h*, and as the inclined plane advances it elevates the roller, turning the shaft P so that its cranked portion *t*, by bearing against the under side of the pin *u*, raises the bar S and rods *v v*, together with the grain collected thereon, a sufficient height to allow the dropper to pass underneath. The moment the bars *e e* of the dropper coincide with the spaces between the rods *v v* the roller *h* coincides with the space *r*, cut out of the projection R at the head of the inclined plane Q, and the roller *h* drops through the space to its former position on the curved plate N, and the slats *v v* consequently drop by their own weight to their former position, leaving the grain remaining on the slats of the dropper platform ready to repeat the above-described movement. It will be thus seen that, as the machine is drawn over the ground, the platform takes the cut grain, conveys it to one side of the machine, and discharges it upon the ground, avoiding entirely the use of the rake, the grain being discharged by the movements of the platform itself. The construction of the platform of slats supported at one end only, in the manner explained, is such as to make it especially applicable to the work required of it, it being thereby made very light, and, consequently, very easy to operate.

What is claimed herein as the invention of said SAMUEL COMFORT, Jr., is—

1. In combination with a harvesting machine, a platform to support the falling grain, made of slats, supported at one end only.

2. A platform, composed of slats supported at one end only, arranged to drop the gavel when a sufficient amount has accumulated thereon to form a sheaf.

3. In combination with a harvesting machine, a platform, which is automatically operated to discharge the grain at one side, and out of the way of the machine on the next round.

4. In combination with a harvesting machine, a platform to receive the cut grain, so arranged as to swing around and drop the gavel at one side out of the way of the team and machine on the next round.

5. In combination with a slatted platform, a device for receiving the cut and falling grain while the gavel is being discharged.

6. In combination with a slatted platform, a device automatically operated for supporting the falling grain while the gavel is being discharged.

7. In combination with a platform, made of slats, supported at one end only, a device for receiving and supporting the cut and falling grain while the gavel is being discharged.

8. In combination with a slatted platform, a device, which is supported at one end only, for the purpose of forming a support for the cut and falling grain while the gavel is being discharged upon the ground.

In testimony whereof I have hereunto set my hand this fourteenth day of February, 1867.

ADAM R. REESE.

Witnesses:

NORMAN B. SMITH,

CHRIS. JOURGENSEN.